(12) United States Patent
Ko et al.

(10) Patent No.: US 9,918,073 B2
(45) Date of Patent: Mar. 13, 2018

(54) INTEGRATED CAMERA SYSTEM HAVING TWO DIMENSIONAL IMAGE CAPTURE AND THREE DIMENSIONAL TIME-OF-FLIGHT CAPTURE WITH MOVABLE ILLUMINATED REGION OF INTEREST

(71) Applicant: Google Inc., Mountain View, CA (US)

(72) Inventors: Jamyuen Ko, San Jose, CA (US); Chung Chun Wan, Fremont, CA (US)

(73) Assignee: Google LLC, Mountain View, CA (US)

( * ) Notice: Subject to any disclaimer, the term of this patent is extended or adjusted under 35 U.S.C. 154(b) by 186 days.

(21) Appl. No.: 14/579,587

(22) Filed: Dec. 22, 2014

(65) Prior Publication Data

US 2016/0182895 A1 Jun. 23, 2016

(51) Int. Cl.
*H04N 13/02* (2006.01)
*G01S 17/89* (2006.01)
*G01S 7/481* (2006.01)

(52) U.S. Cl.
CPC ....... *H04N 13/0285* (2013.01); *G01S 7/4813* (2013.01); *G01S 7/4815* (2013.01); *G01S 7/4817* (2013.01); *G01S 17/89* (2013.01); *H04N 13/0253* (2013.01); *H04N 13/0271* (2013.01)

(58) Field of Classification Search
CPC ........... H04N 13/0285; H04N 13/0253; H04N 13/0296; H04N 5/2257; G06K 9/2027; G01B 11/026
USPC ....................................................... 348/46
See application file for complete search history.

(56) References Cited

U.S. PATENT DOCUMENTS

| | | |
|---|---|---|
| 6,157,387 A | 12/2000 | Kotani |
| 7,560,679 B1 | 7/2009 | Gutierrez |
| 7,936,038 B2 | 5/2011 | Jeong et al. |
| 7,990,636 B2 | 8/2011 | Park et al. |
| 8,027,107 B2 | 9/2011 | Hwang et al. |
| 8,116,018 B2 | 2/2012 | Park et al. |
| 8,134,637 B2 | 3/2012 | Rossbach et al. |

(Continued)

FOREIGN PATENT DOCUMENTS

| | | |
|---|---|---|
| KR | 10-2011-0064622 A | 6/2011 |
| KR | 10-2014-0028536 A | 3/2014 |
| WO | WO 2014/125272 | 8/2014 |

OTHER PUBLICATIONS

PCT/US2015/061060—International Search Report and Written Opinion, dated Feb. 24, 2016, 9 pages.

(Continued)

*Primary Examiner* — Jared Walker
(74) *Attorney, Agent, or Firm* — Fish & Richardson P.C.

(57) ABSTRACT

An apparatus is described having an integrated two-dimensional image capture and three-dimensional time-of-flight depth capture system. The integrated two-dimensional image capture and three-dimensional time-of-flight depth capture system includes an illuminator to generate light for the time-of-flight depth capture system. The illuminator includes an array of light sources and a movable lens assembly. The movable lens assembly is to movably direct an emitted beam of the light to one of any of a plurality of locations within the illuminator's field of view to form an illuminated region of interest within the illuminator's field of view. The illuminated region of interest has a size that is smaller than the illuminator's field of view.

15 Claims, 16 Drawing Sheets

(56) References Cited

U.S. PATENT DOCUMENTS

Figure 1A:
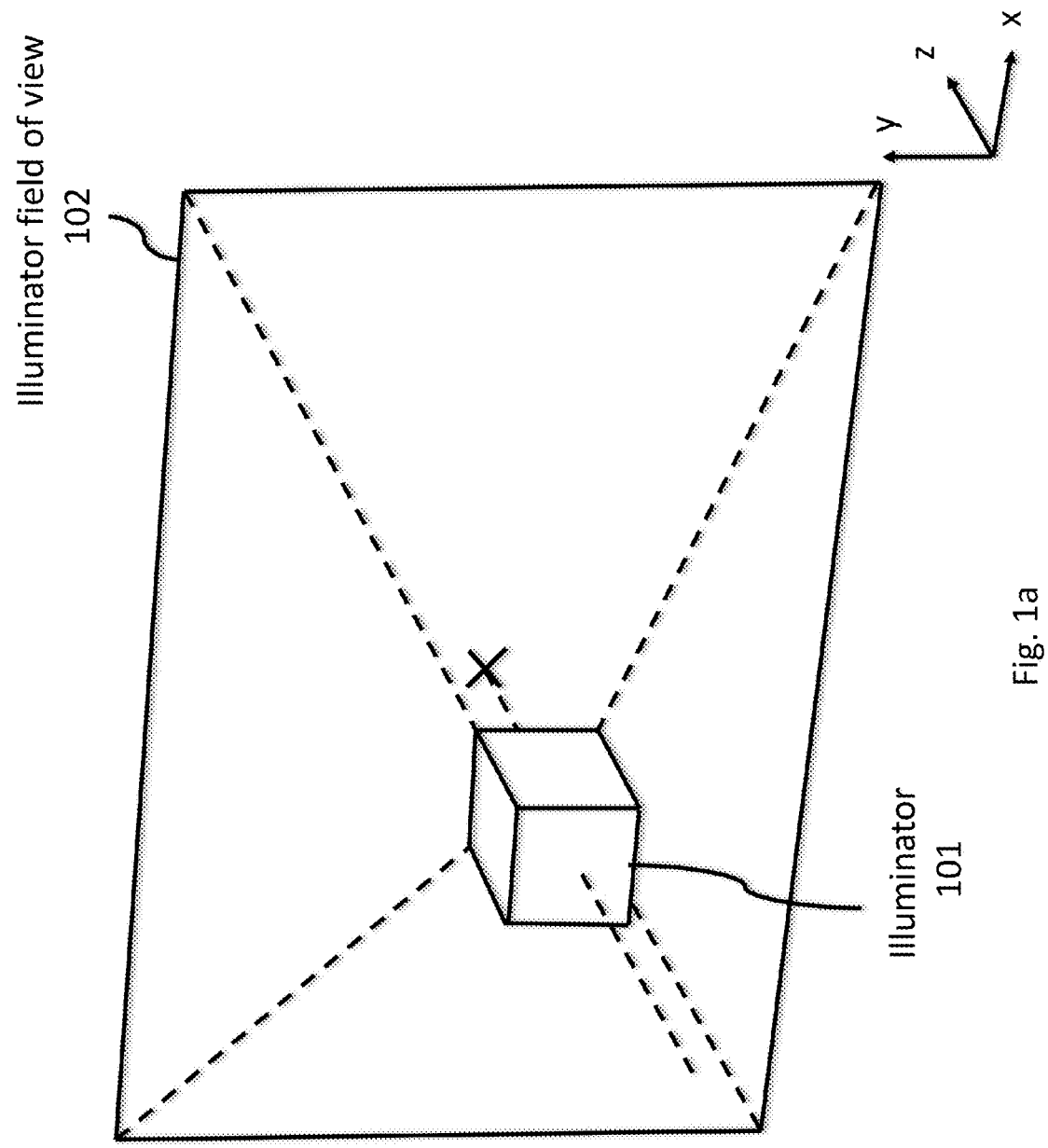

| | | | |
|---|---|---|---|
| 8,159,016 B2 | 4/2012 | Lee et al. | |
| 8,159,762 B2 | 4/2012 | Lim et al. | |
| 8,218,016 B2 | 7/2012 | Park et al. | |
| 8,320,621 B2 | 11/2012 | McEldowney | |
| 8,761,594 B1* | 6/2014 | Gross | H04N 5/2256 396/155 |
| 2004/0114921 A1* | 6/2004 | Braun | B60Q 9/008 396/661 |
| 2007/0236582 A1 | 10/2007 | Romano et al. | |
| 2011/0194007 A1 | 8/2011 | Kim et al. | |
| 2011/0242115 A1 | 10/2011 | Tsao et al. | |
| 2012/0033857 A1 | 2/2012 | Bergeron et al. | |
| 2012/0147235 A1 | 6/2012 | Parks | |
| 2013/0026859 A1 | 1/2013 | Bae et al. | |
| 2013/0131836 A1 | 5/2013 | Katz et al. | |
| 2013/0134470 A1 | 5/2013 | Shin et al. | |
| 2013/0163627 A1 | 6/2013 | Seurin et al. | |
| 2013/0188022 A1 | 7/2013 | Katz et al. | |
| 2013/0201292 A1 | 8/2013 | Walter et al. | |
| 2013/0234029 A1 | 9/2013 | Bikumandla | |
| 2013/0291414 A1 | 11/2013 | Cegnar | |
| 2014/0028870 A1 | 1/2014 | Plowman et al. | |
| 2014/0049610 A1 | 2/2014 | Hudman et al. | |
| 2014/0055771 A1* | 2/2014 | Oggier | G01S 17/89 356/5.01 |
| 2014/0152813 A1 | 6/2014 | Wilks et al. | |
| 2014/0160259 A1 | 6/2014 | Blanquart et al. | |
| 2014/0176663 A1 | 6/2014 | Cutler et al. | |
| 2014/0211193 A1 | 7/2014 | Bloom et al. | |
| 2015/0260830 A1 | 9/2015 | Ghosh | |

OTHER PUBLICATIONS

PCT/US2015/058646—International Search Report and Written Opinion, dated Mar. 3, 2016, 13 pages.

International Search Report and Written Opinion issued in International Application No. PCT/US2015/062157, dated Mar. 8, 2016, 12 pages.

International Preliminary Report on Patentability, issued in International Application No. PCT/2015/058646, dated Jun. 27, 2017, 9 pages.

* cited by examiner

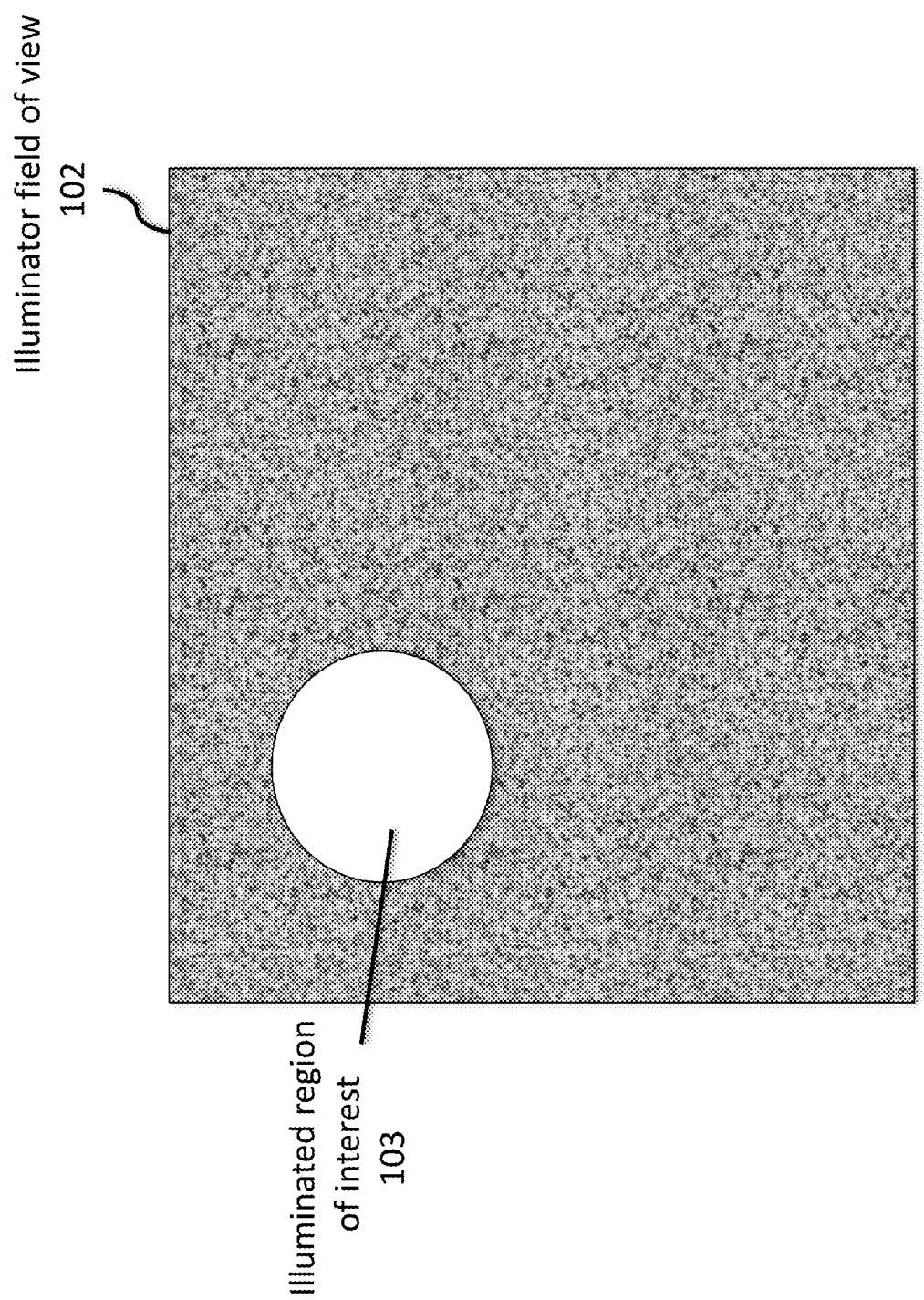

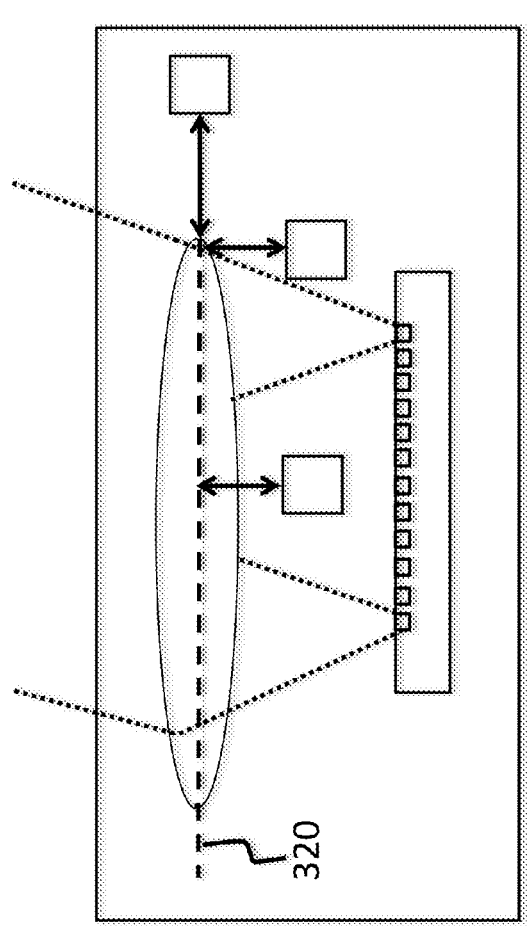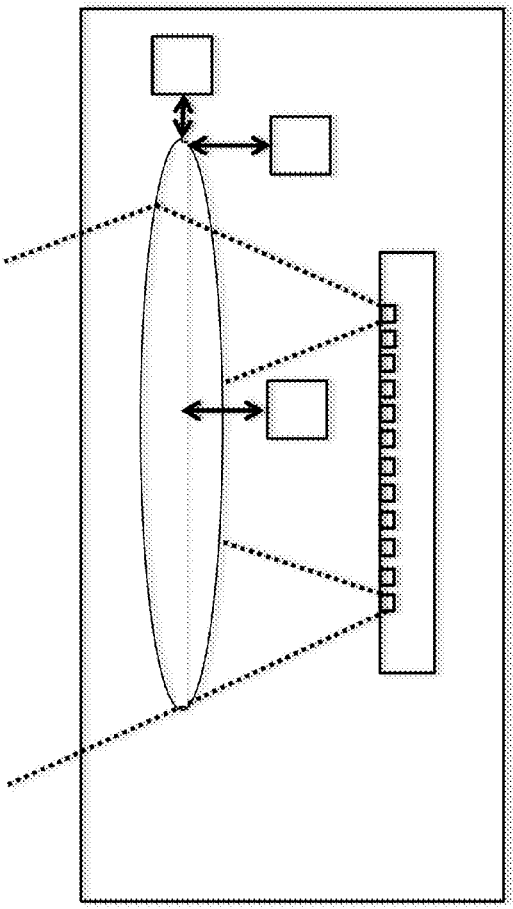
Fig. 3b(i)
Fig. 3b(ii)
Fig. 3b

INTEGRATED CAMERA SYSTEM HAVING TWO DIMENSIONAL IMAGE CAPTURE AND THREE DIMENSIONAL TIME-OF-FLIGHT CAPTURE WITH MOVABLE ILLUMINATED REGION OF INTEREST

FIELD OF INVENTION

The field of invention pertains generally to computing system peripherals, and, more specifically, to an integrated camera system having two dimensional image capture and three dimensional time-of-flight capture with movable illuminated region of interest.

BACKGROUND

Many existing computing systems include a traditional camera as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

One depth information capturing approach, referred to as "time-of-flight" imaging, emits light from a system onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (z) at each of the different (x,y) pixel locations.

As many computing systems with imaging capability are mobile in nature (e.g., laptop computers, tablet computers, smartphones, etc.), the integration of a light source ("illuminator") into the system to achieve "time-of-flight" operation presents a number of design challenges such as cost challenges, packaging challenges and/or power consumption challenges.

SUMMARY

An apparatus is described having an integrated two-dimensional image capture and three-dimensional time-of-flight depth capture system. The integrated system includes an illuminator to generate light for the time-of-flight depth capture system. The illuminator includes an array of light sources and a movable lens assembly. The movable lens assembly is to movably direct an emitted beam of the light to one of any of a plurality of locations within the illuminator's field of view to form an illuminated region of interest within the illuminator's field of view. The illuminated region of interest has a size that is smaller than the illuminator's field of view.

FIGURES

Figure 1C:
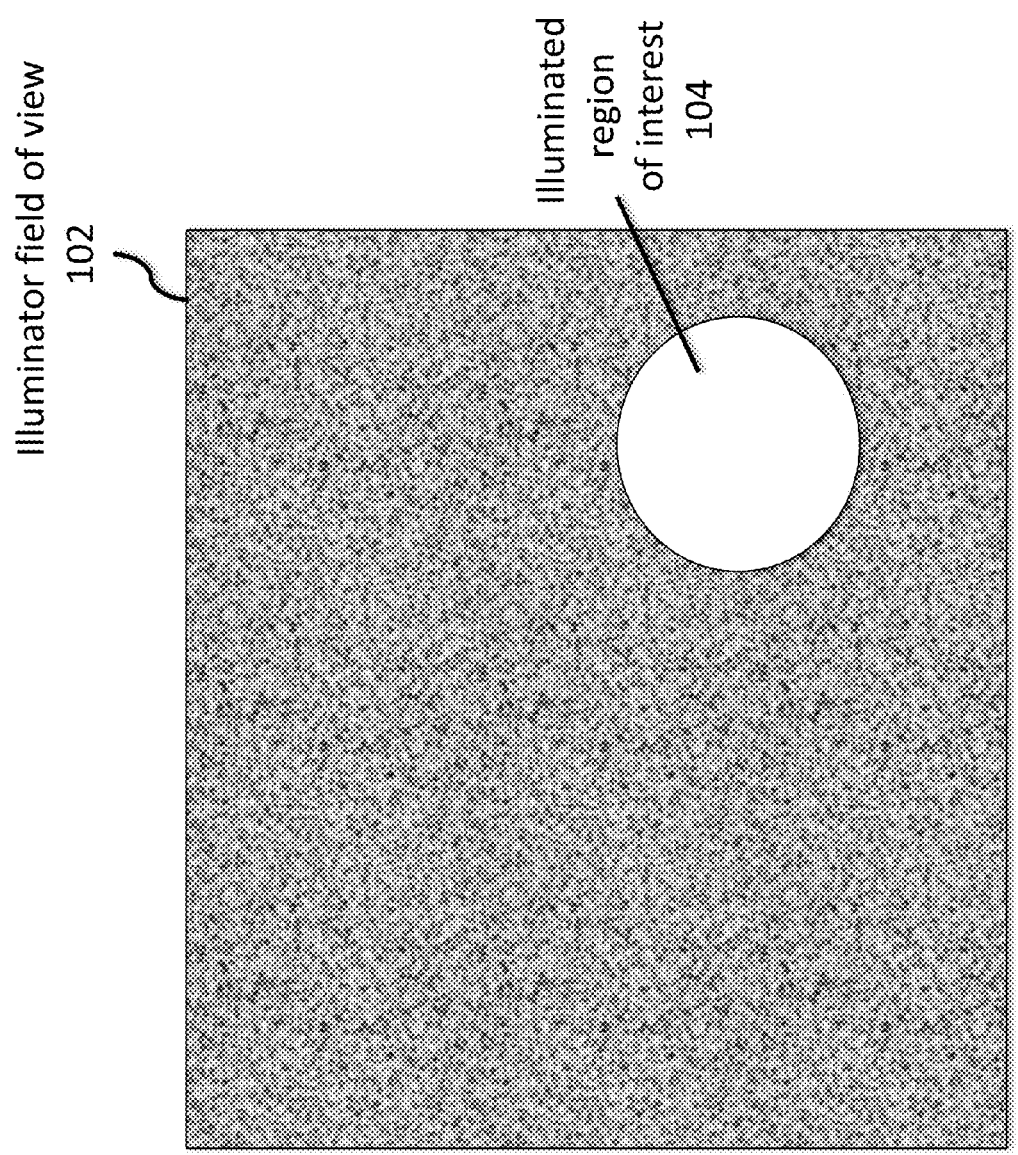
Figure 1D:
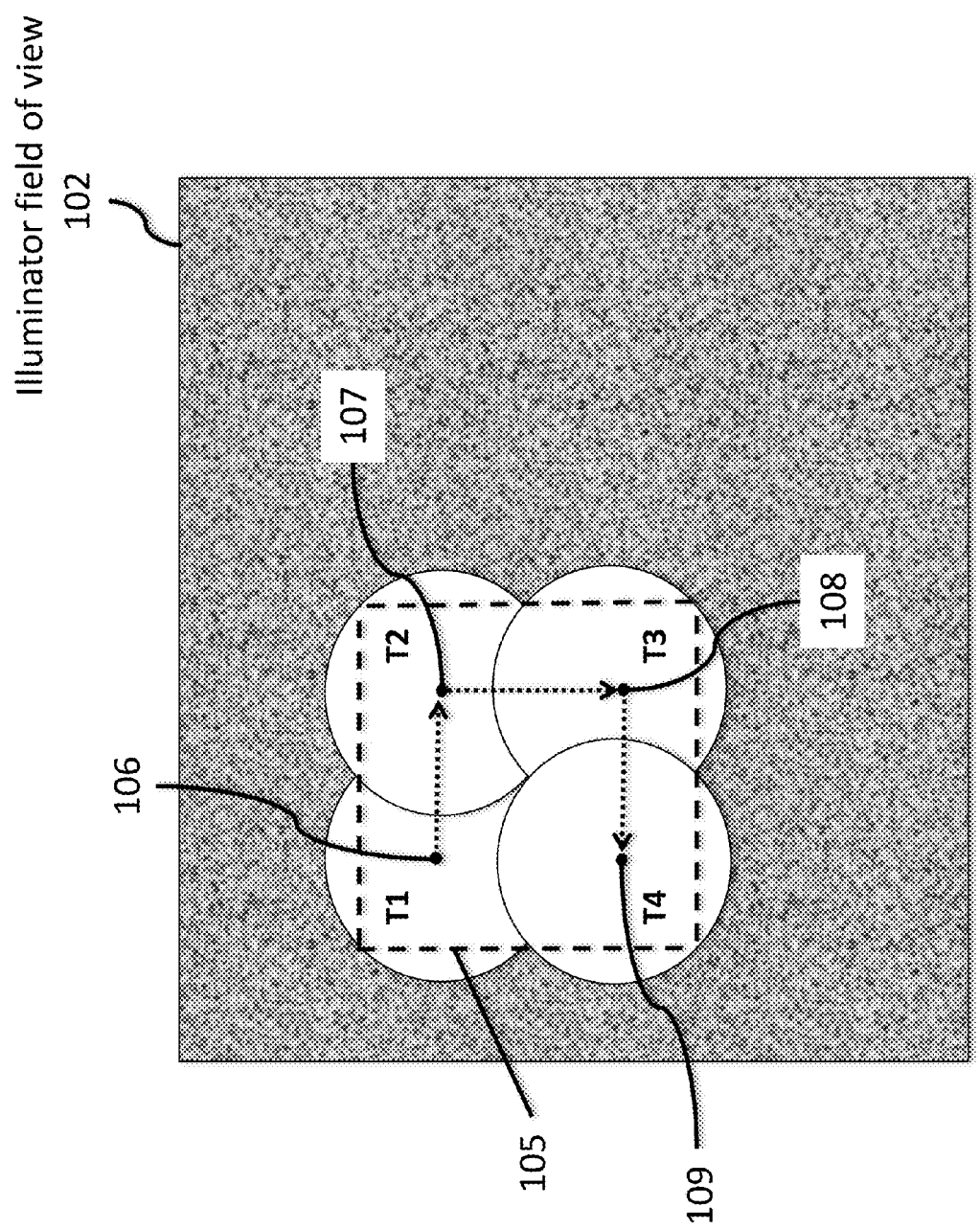
Figure 1E:
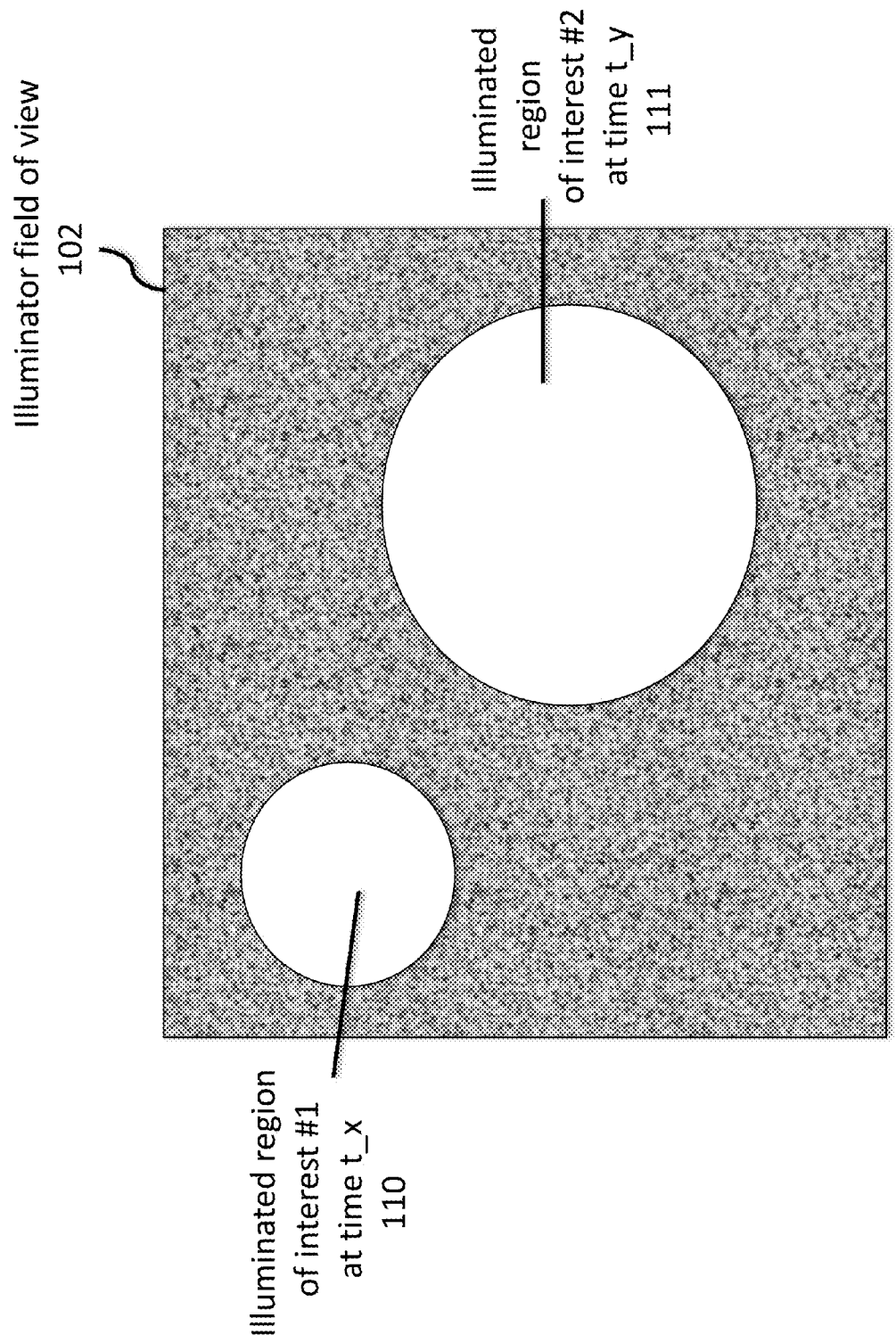
Figure 2A:
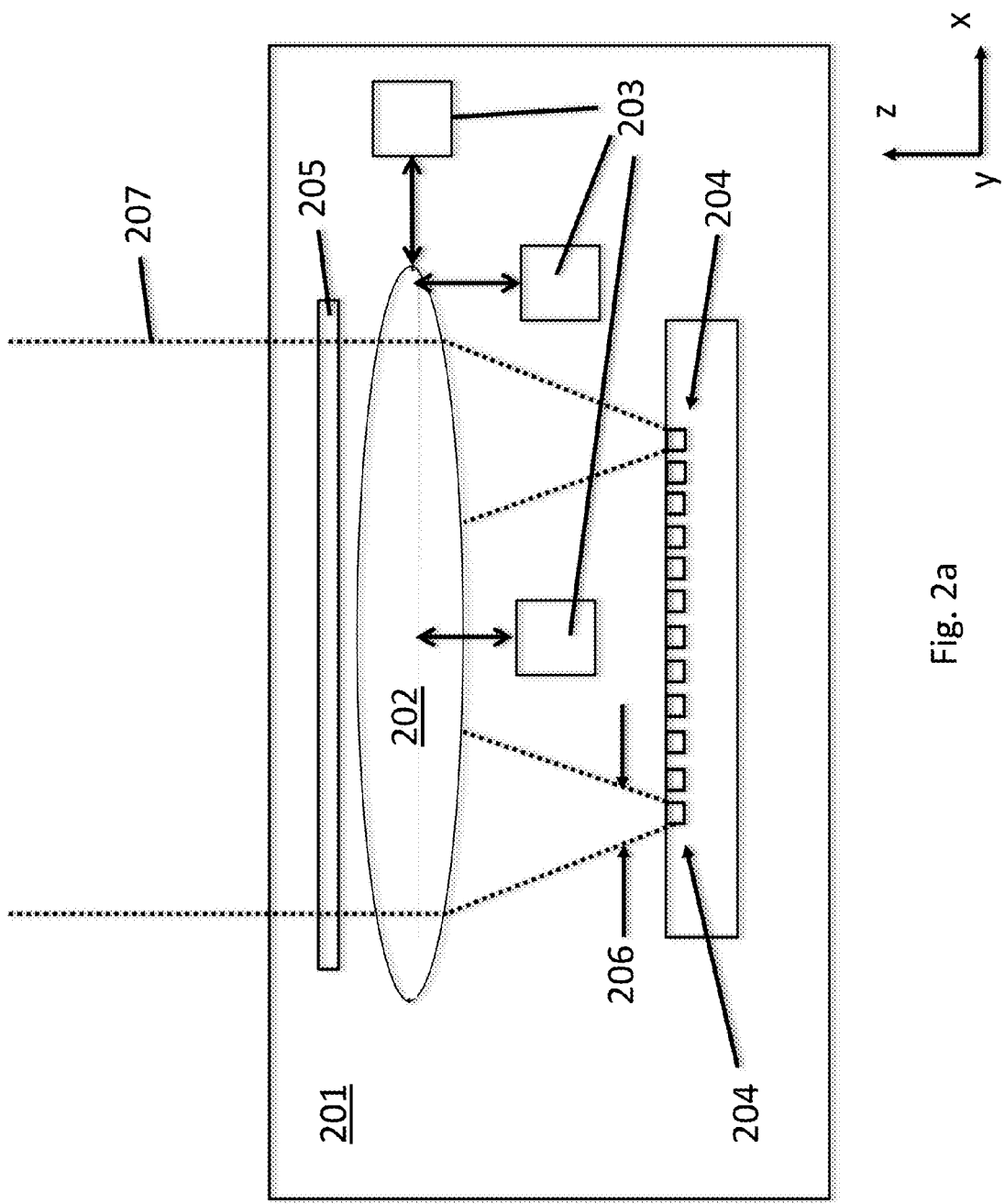
Figure 2B:
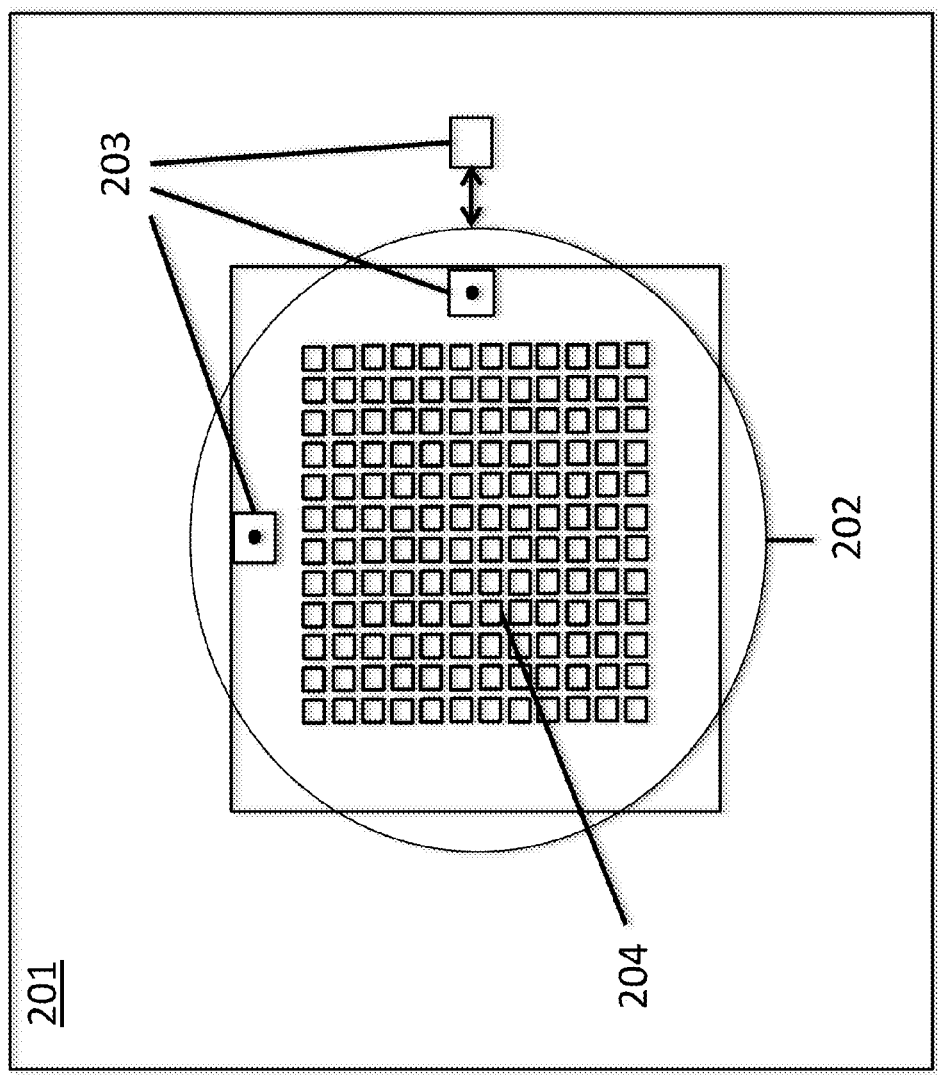
Figure 3A:
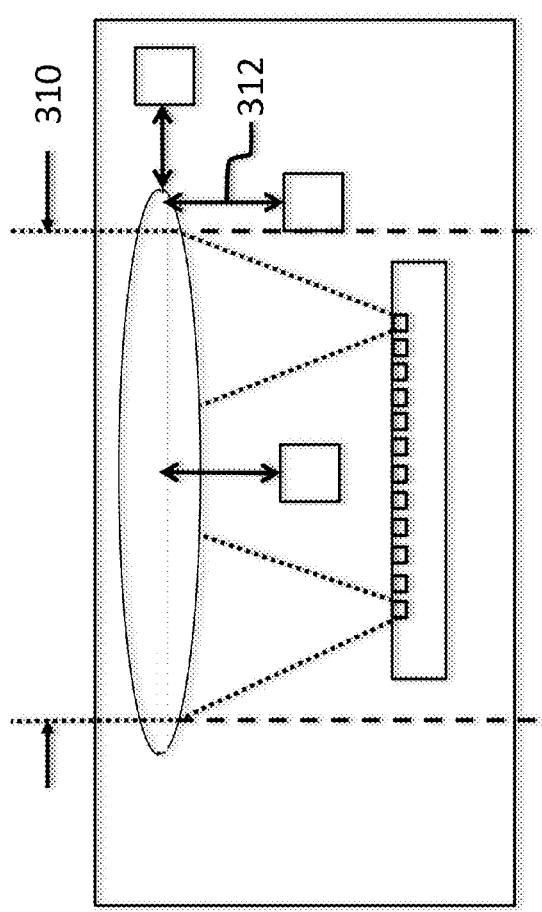
Figure 3A:
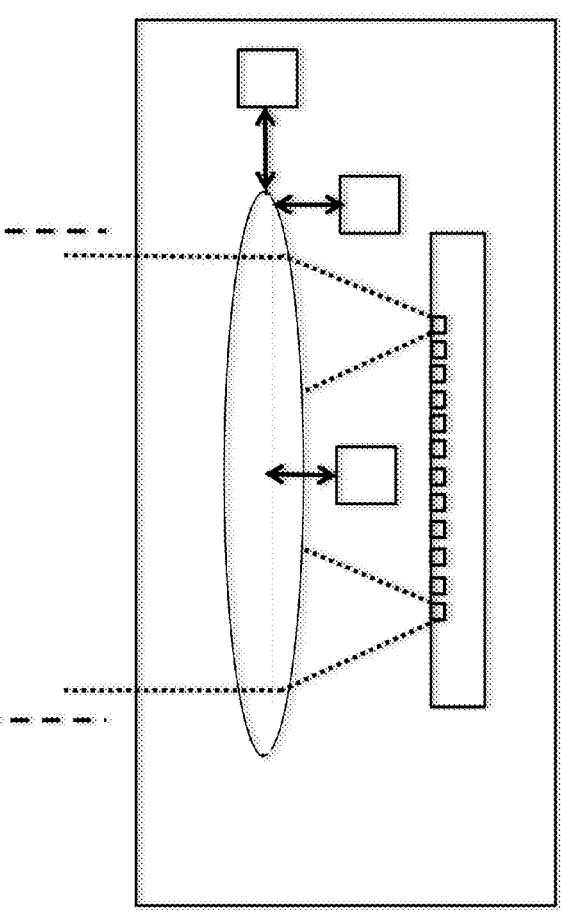
Figure 3C:
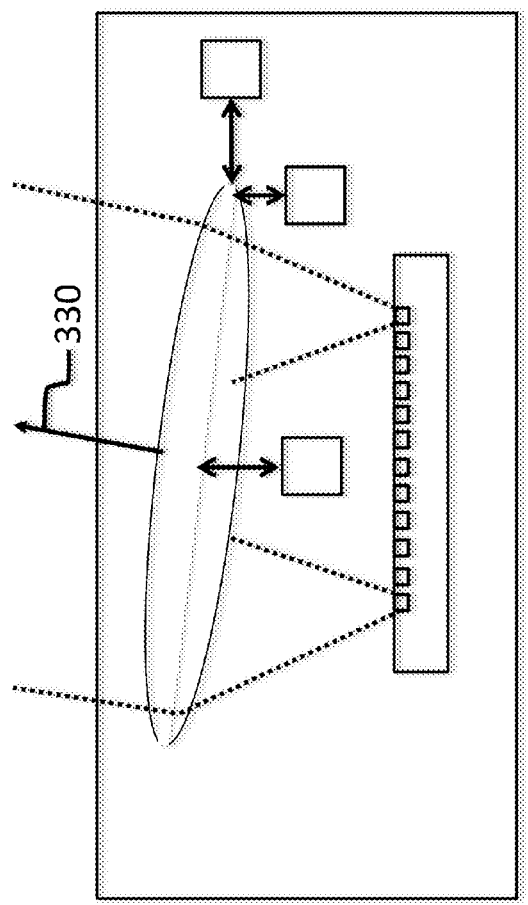
Figure 3C:
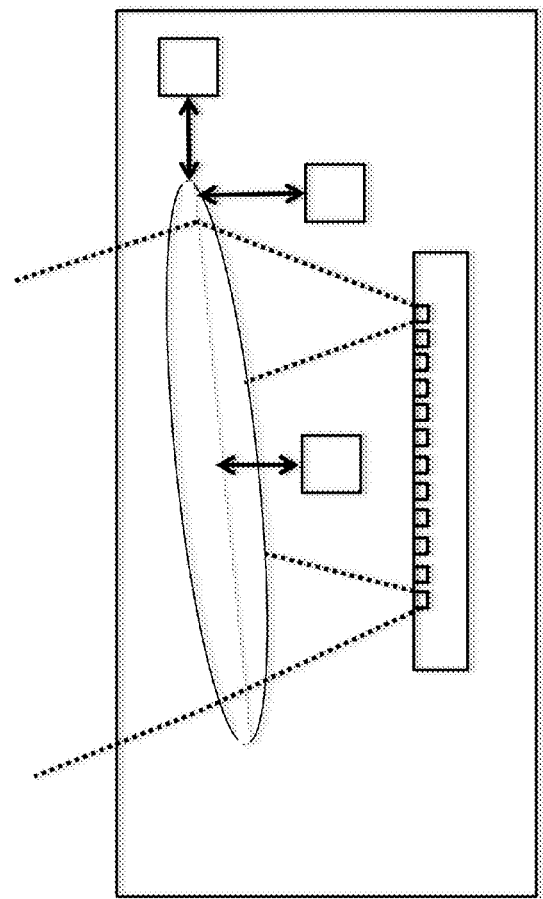
Figure 4A:
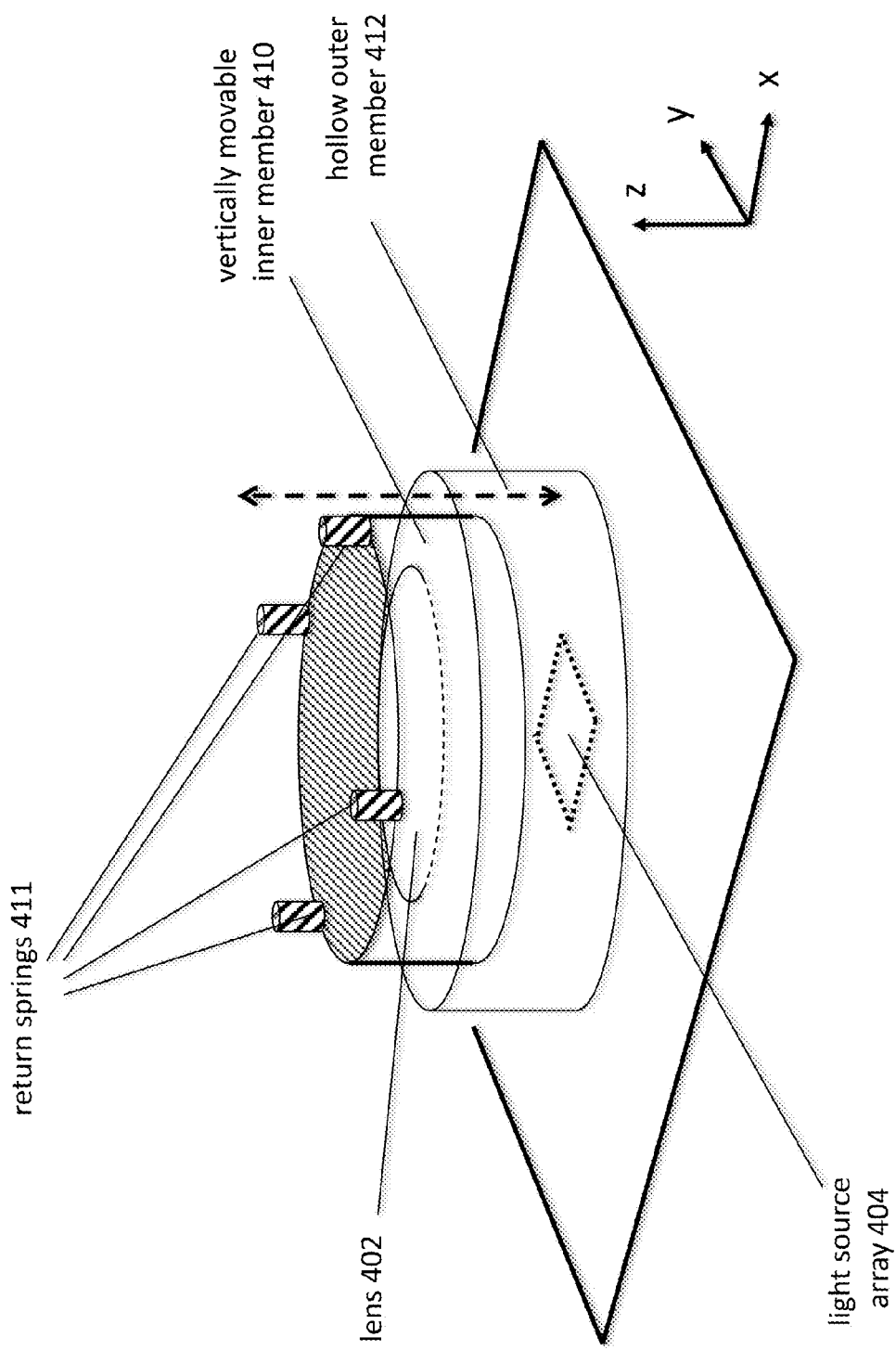
Figure 4B:
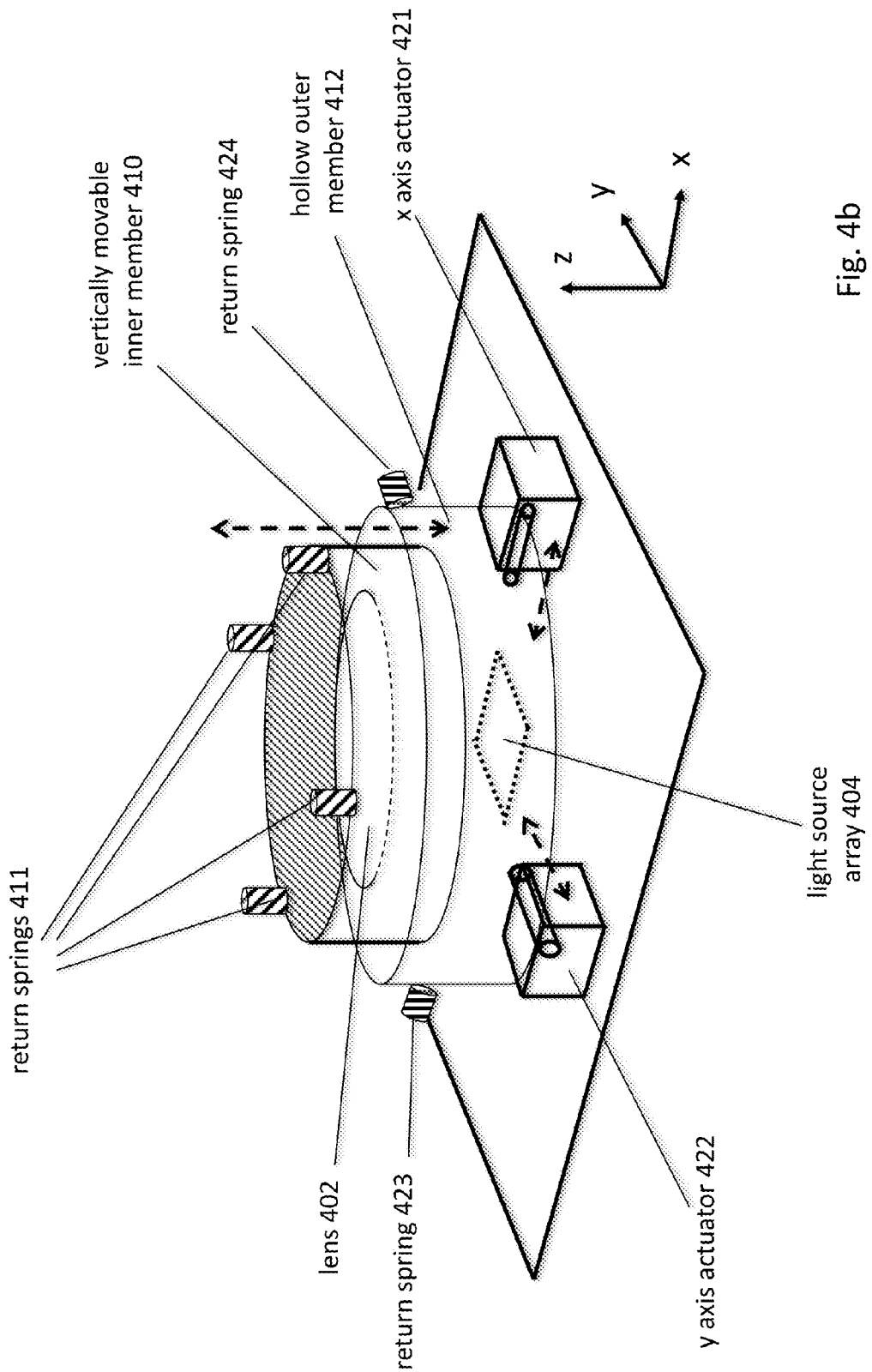
Figure 4C:
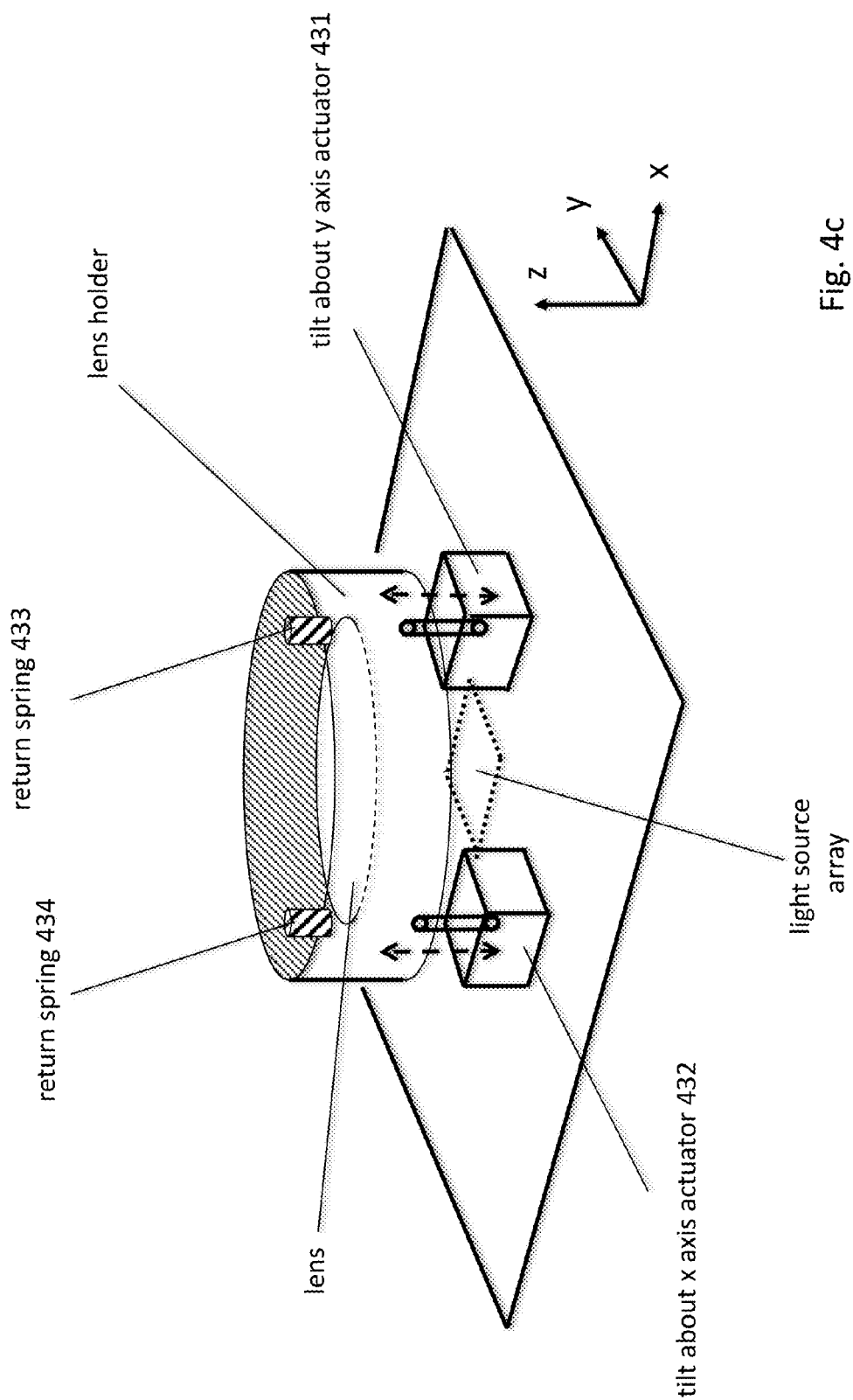
Figure 5A:
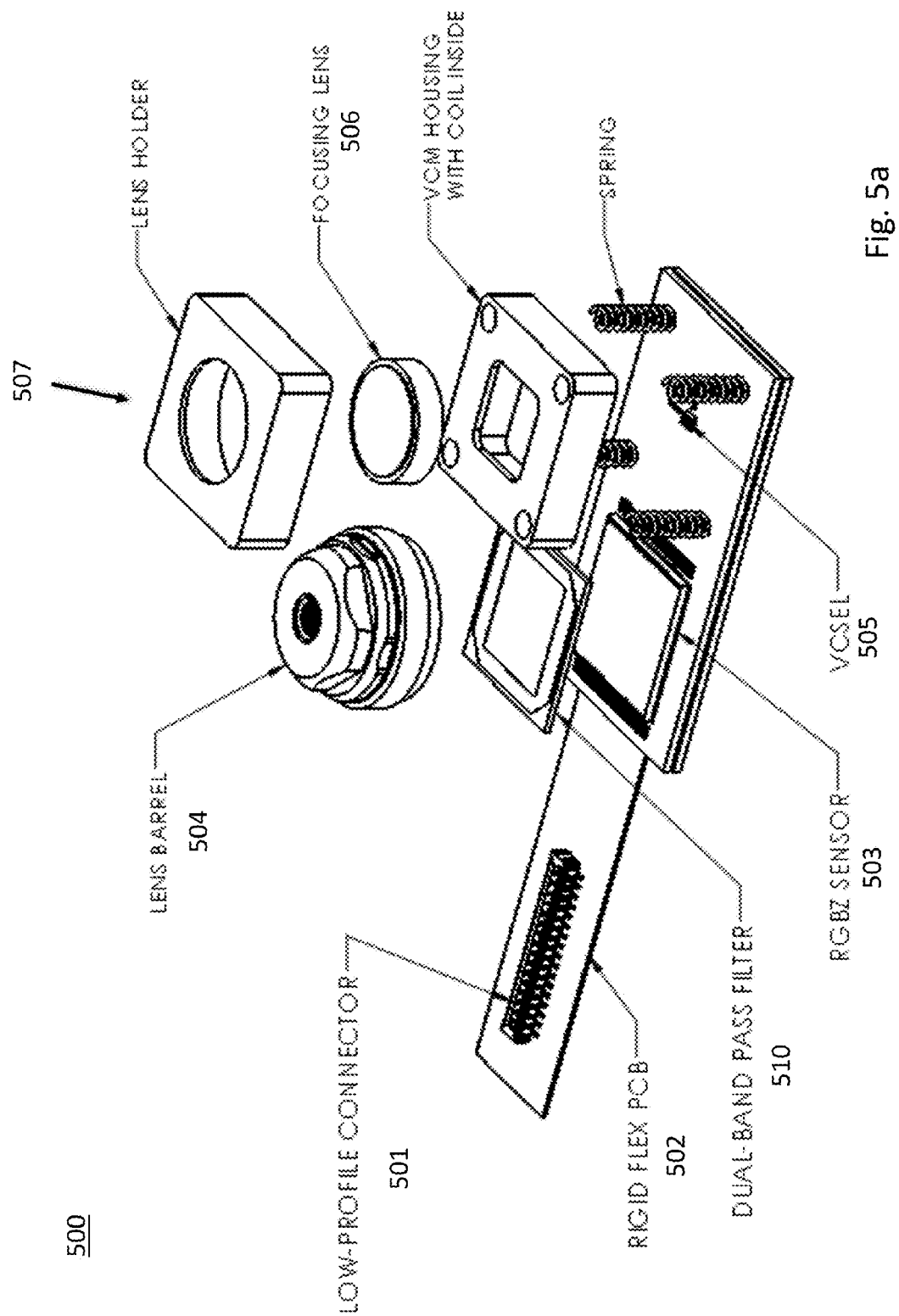
Figure 5B:
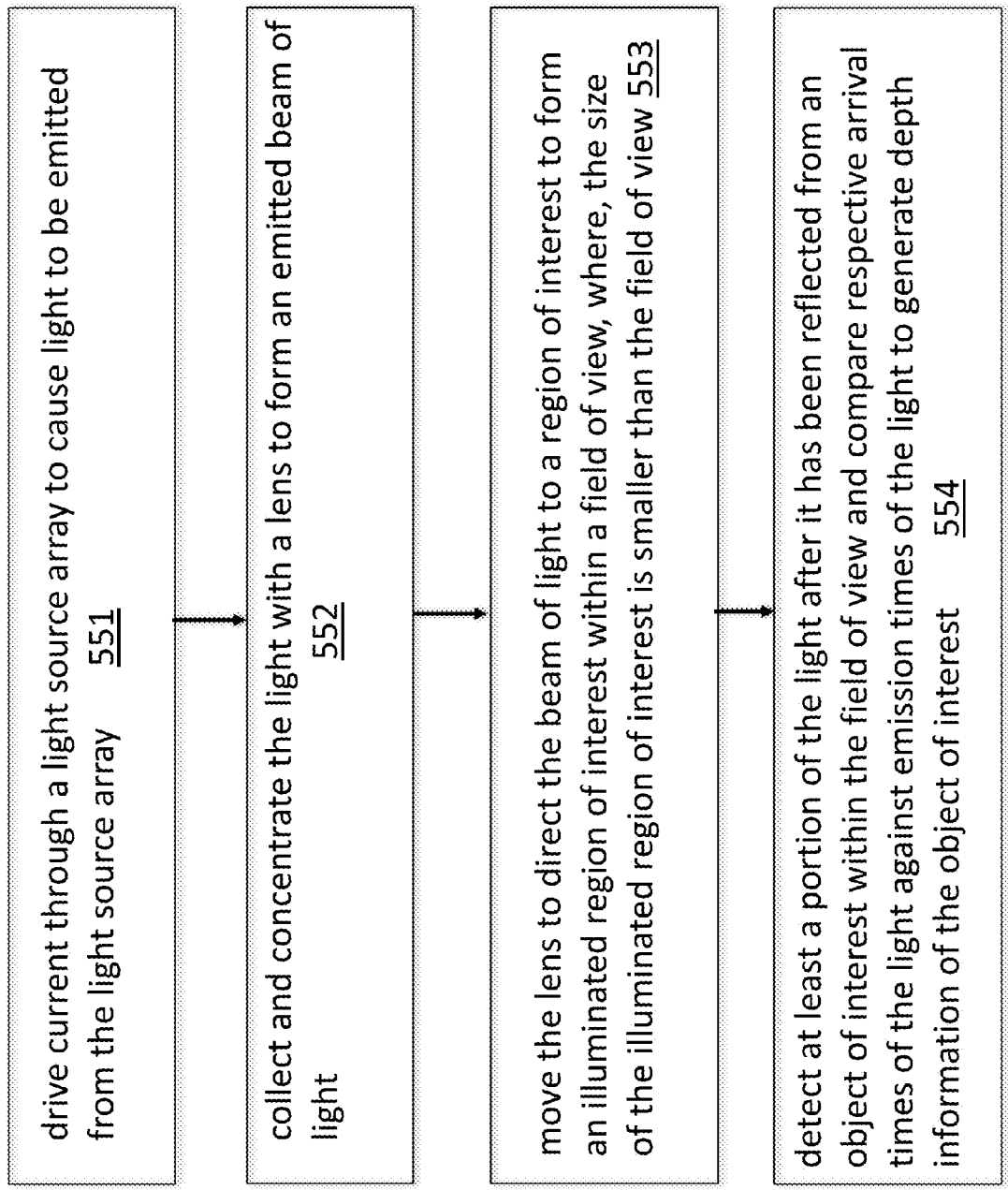
Figure 6:
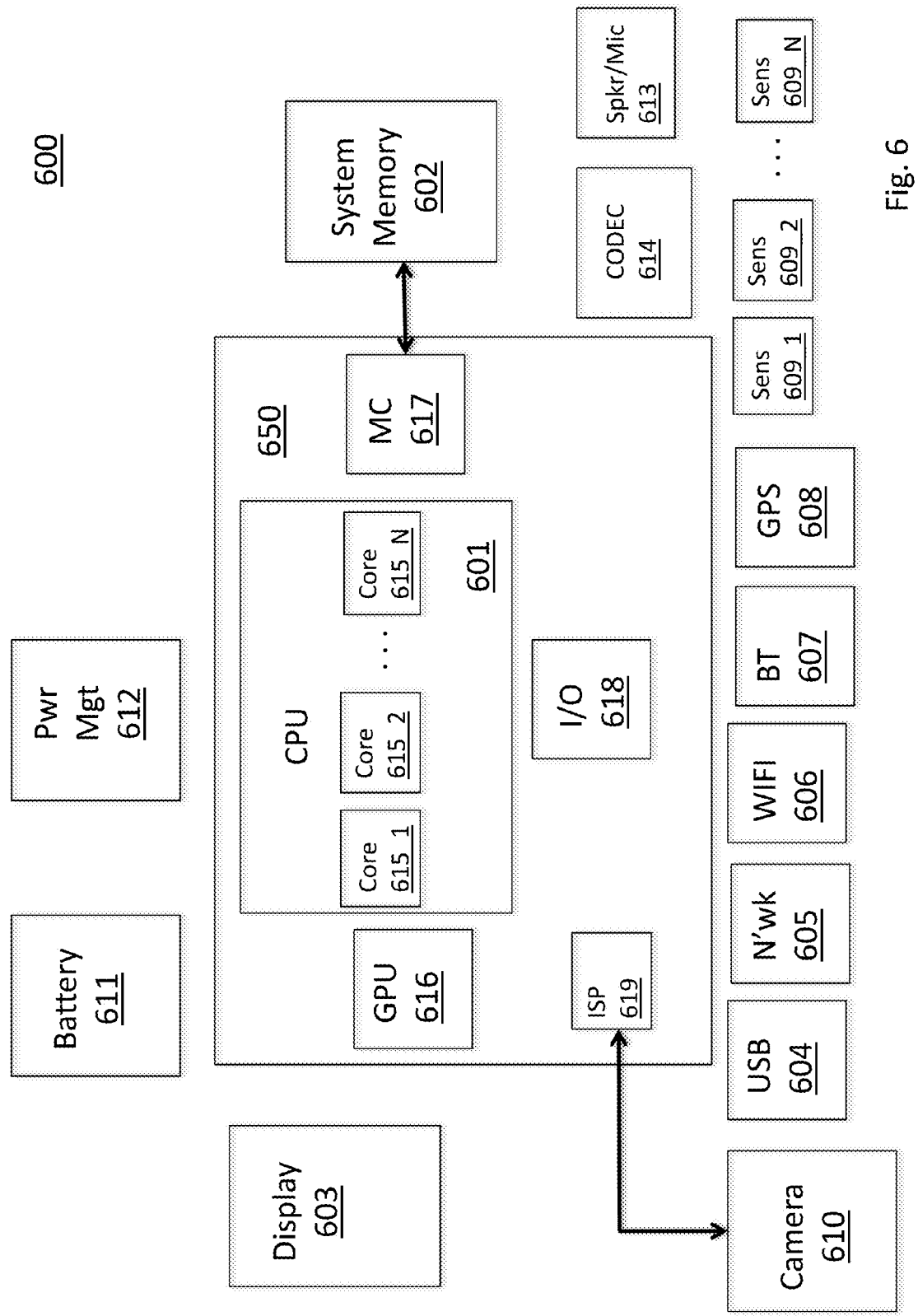

The following description and accompanying drawings are used to illustrate embodiments of the invention. In the drawings:

FIG. 1a shows an illuminator and its field of view;
FIG. 1b shows a first illuminated region of interest;
FIG. 1c shows a second illuminated region of interest;
FIG. 1d shows scanning of an illuminated region of interest;
FIG. 1e shows different sized illuminated regions of interest;
FIG. 2a shows a side view of an illuminator capable of illuminating a region of interest and scanning the illuminated region of interest;
FIG. 2b shows a top down view of the illuminator of FIG. 2a;
FIG. 3a illustrates changing the size of the illuminated region of interest by adjusting the distance between a lens and a light source array;
FIG. 3b illustrates that the direction of an emitted beam can be determined by adjusting the lateral offset of a lens with respect to a light source array;
FIG. 3c illustrates that the direction of an emitted beam can be determined by tilting the angle of a lens;
FIG. 4a shows a movable lens assembly for moving a lens vertically with respect to a light source array;
FIG. 4b shows a movable lens assembly for moving a lens vertically and laterally with respect to a light source array;
FIG. 4c shows a movable lens assembly for tilting a lens relative to a light source array;
FIG. 5a shows an embodiment of an integrated camera having both traditional 2D image capture and 3D time-of-flight image capture functions;
FIG. 5b shows a method performed by the system of FIG. 5a;
FIG. 6 shows an embodiment of a computing system.

DETAILED DESCRIPTION

A "smart illumination" time-of-flight system addresses some of the design challenges mentioned above. As will be made more clear in the following discussion, a "smart illumination" time-of-flight system can emit light on only a "region-of-interest" within the illuminator's field of view. As a consequence, the intensity of the emitted optical signal is strong enough to generate a detectable signal at the image sensor, while, at the same time, the illuminator's power consumption does not appreciably draw from the computer system's power supply.

One smart illumination approach is to use a movable objective lens to collect and concentrate divergent light from an array of light sources into a more intense beam of light that can be directed to various regions of interest within the illuminator's field of view. A review of some features of this particular approach are discussed immediately below with respect to FIGS. 1a through 1d.

Referring to FIG. 1a, an illuminator 101 possesses a field of view 102 over which it has the ability to shine light. In certain situations and/or when operating in support of certain applications, the illuminator 101 may only direct light to a smaller region within the field of view 102. As an example, referring to FIG. 1b, only region 103 within the field of view 102 is illuminated. By contrast, as observed in FIG. 1c, only region 104 within the field of view is illuminated. In various embodiments, as discussed in more detail further below, the illuminated region can be directed to essentially any location within the field of view 102.

A challenge that "smart illumination" addresses is the desire to emit an optical signal having sufficient strength to generate a detectable signal at the image sensor, while, at the same time, avoiding excessive power consumption by the light source that generates the emitted light. One approach, therefore, is to effectively reduce the natural emission angle of the physical light source(s) (e.g., LED(s) or laser(s)) by collecting and concentrating their divergent light through an objective lens to produce less divergent light (such as collimated or more focused light). The deliberate shaping of a less divergent emitted beam into a narrower beam effectively concentrates greater optical signal power onto a smaller region of interest 103, 104 within the illuminator's field of view.

Additionally, in cases where a larger illuminated region size is desired, smart illumination technology may "scan" the larger area with a smaller illuminated region. For example, as observed in FIG. 1d, if an application desires to illuminate larger area 105 within the field of view 102, the illuminator may effectively illuminate region 105 by scanning a smaller sized illuminated region across area 105. As depicted in FIG. 1d, at time t1 the illuminated region is centered at location 106, at time t2 the illuminated region is centered at location 107, at time t3 the illuminated region is centered at location 108 and at time t4 the illuminated region is centered at location 109. Here, so long as the information taken from the sensor is understood to span across a time period that extends approximately from time t1 to time t4, the illumination of larger sized region 105 can be comprehended even though a smaller sized illumination region was used.

Further still, as observed in FIG. 1e, in various embodiments, the size of the illuminated region 110, 111 itself may be varied. Generally, larger illuminated region size may be tolerated commensurate with the extent to which weaker received signal strength at the sensor can be tolerated (e.g., the object of interest is closer to the illuminator, there is less conflicting ambient light, etc.) and/or the extent to which the system higher power consumption draw from the power supply can be tolerated. Of course, the larger the illuminated region, the less scanning activity that would need to be performed by the illuminator to effectively illuminate a larger region of interest. Conceivably, some situations may permit a single illuminated region to be large enough to fill the entire field of view 102.

Thus, to summarize, the illuminator 101 of FIG. 1a concentrates the optical power from its light source(s) over a smaller region of illumination to boost received signal strength at the receiver. Because the illuminator 101 illuminates a smaller region, the illuminator is designed with the ability to move the smaller illuminated region to various locations within the field of view 102. In some circumstances the illuminator 101 may scan the smaller illuminated region across a larger surface area to effectively illuminate the larger surface area. Additionally, the illuminator 101 may be designed to adjust the size of the illuminated region.

Which region of the field of view is to be illuminated, what size the illuminated region is to have and whether or not any scanning is to be performed is a function of the particular condition/situation of the computing system and/or the particular application that it is executing. Examples of some situations/conditions/applications include, to name a few, intelligent recognition of a person's face (e.g., for secure access to the computing system) or intelligent recognition of the formation of a person's hand (e.g., for a user interface of the computing system that supports hand gesture recognition). Here, the person's face or hand ("the object of interest") is apt to consume only a portion of the field of view 102.

FIGS. 2a and 2b show different perspective views of an embodiment of an illuminator 201 having an objective lens 202 whose mechanical fixturing includes one or more electro-mechanical motors 203 that provide for movement of the objective lens 202 in various degrees of freedom (depending on implementation). A light source array 204 resides beneath the objective lens 202. In operation, when the light sources of the light source array 204 are "on", the light emitted by the light source array 204 is collected, shaped and directed by the lens 202 as a function of the positioning the lens 202 relative to the light source array 204.

The light source array 204 may be implemented, for example, as an array of light-emitted-diodes (LEDs) or lasers such as vertical cavity surface emitting lasers (VCSELs). In an embodiment, the various light sources of the array are integrated on a same semiconductor chip substrate. In a typical implementation the light sources of the array emit non-visible (e.g., infra-red (IR)) light so that the reflected time-of-flight signal does not interfere with the traditional visible light image capture function of the computing system. Additionally, in various embodiments, each of the light sources within the array may be connected to the same anode and same cathode so that all of the light sources within the array are either all on or all off (alternative embodiments could conceivably be designed to permit subsets of light sources within an array to be turned on/off together).

An array of light sources tends to emit more uniform light than a single light source. Here, each light source (such as a single LED or VCSEL) by itself tends to emit non-uniform light. That is, the surface area of a region that is illuminated by a single LED or VCSEL will tend to have brighter spots and darker spots. By integrating a number of light sources into an array, emitted light from different devices tends to overlap resulting in dark spots from some light sources being irradiated by the bright spots of others. As such, the overall emitted light from the array tends to have a more uniform intensity profile.

To further promote the emission of uniform light, the illuminator may optionally include a diffuser 205. Light is scattered as it propagates through the diffuser 205 resulting in more uniform light exiting the diffuser 205 than light entering the diffuser 205. Although the diffuser 205 is depicted in FIG. 2 as being between the objective lens 202 and the exit port of the illuminator 201, conceivably, the diffuser 205 may reside anywhere along the optical path of the illuminator 201.

Additionally, as discussed above with respect to FIGS. 1a through 1e, note that the individual light sources typically have a wide emitted light divergence angle 206. The wide divergence angle 206 of the individual light sources results in a wide divergence angle from the light source array 204 as a whole. As observed in FIG. 2a, the objective lens 202 collects the diverging light from the light source array 204 and forms a beam of emitted light 207 that is collimated or that is converging or at least has a smaller divergence angle.

Collecting diverging light from the light source array 204 and forming a beam of more concentrated light increases the optical intensity per unit area of the emitted beam which, in turn, results in a stronger received signal at the sensor. According to one calculation, if the divergence angle 206 from the light source array is 60°, reducing the emitted beam's divergence angle to 30° will increase the signal strength at the sensor by a factor of 4.6. Reducing the emitted beam's divergence angle to 20° will increase the signal strength at the sensor by a factor of 10.7.

Boosting received signal strength at the sensor through optical concentration of the emitted light from the light source array 204 (as opposed to simply emitting higher intensity light from the light source array 204) preserves battery life as the light source array 204 will be able to sufficiently illuminate an object of interest without consuming significant amounts of power.

FIGS. 3a through 3c provide some basic examples/embodiments of how the size and location of the illuminated region can be affected through manipulation of the positioning of the objective lens 202.

As observed in FIG. 3a, the size of the illuminated region 310 can be adjusted by varying the vertical distance 312 between the objective lens and the light source array. As discussed above, the objective lens forms a more collimated beam from a diverging light source. As the lens moves farther away from the array (FIG. 3a(i)), a wider radius of the diverging light is collected from the light source array by the lens resulting in an emitted beam shape having a wider width 310. Contra-wise, as the lens moves closer to the array (FIG. 3a(ii)), a smaller radius of the diverging light is collected from the light source array by the lens resulting in an emitted beam shape having a narrower width. Mechanical designs having electro-mechanical motorization for vertical lens movement as discussed just above with respect to FIG. 3a are provided further below. In an embodiment, the lens is placed closest to the light source array when the entire field of view is to be illuminated.

As observed in FIG. 3b, the location of the illuminated region within the field of view can be adjusted by varying the horizontal location of the objective lens relative to the light source array. In the specific approach of FIG. 3b, the position of the light source array is fixed and the objective lens is controllably moved along a plane 320 that resides parallel to and above the surface of the light source array. Generally, the greater the mis-alignment between the lens and light source array (as measured along plane 320), the greater the pointing angle of the emitted beam from the illuminator. Additionally, the direction of the mis-alignment determines the pointing direction of the emitted beam. For example, as observed in FIG. 3b(i), misalignment in a first direction produces a beam that points along a first beam direction. By contrast, misalignment in a second opposite direction, as observed in FIG. 3b(ii), produces a beam that points along a second beam direction that is opposite that of the first beam direction. Again, mechanical designs having electro-mechanical motorization for horizontal lens movement as discussed just above with respect to FIG. 3b are provided further below.

Alternatively or in combination with the approach of FIG. 3b, as observed in FIG. 3c, the location of the illuminated region within the field of view can also be adjusted by varying the tilt angle of the objective lens. That is, tilting the lens will cause the beam to point in a direction that extends outward along the normal 330 from the outer surface of the lens. Mechanical designs having electro-mechanical motorization for inducing lens tilt as discussed just above with respect to FIG. 3c are also provided further below.

FIG. 4a shows a more detailed movable lens assembly for adjusting the vertical distance of the objective lens 402 from the light source array 404. As observed in FIG. 4a, a voice coil motor composed of a vertically movable inner member 410 with spring return 411 and hollow outer member 412 may be utilized where the objective lens 402 is housed within the vertically movable inner member 410. The object lens 402, being fixed to the inner member 410, moves vertically with the inner member 410 whose vertical position along the z axis is defined by the motor force applied by the inner member 410 against the return springs 411. The motor force is defined by a voltage applied to the motor's coil. In a typical implementation the coil is integrated with the inner member 410 and the outer member 412 includes a permanent magnet. A magnetic field responsive to a current driven through the coil interacts with the permanent magnet's magnetic field which determines the force applied to the inner member.

Here, voice-coil motors with spring return typically have a direct current-position relationship and therefore do not require a positioning sensor for feedback control. For ease of drawing, a housing surrounds the voice coil motor that the return springs compress 411 against as the inner member 410 extends higher along the z axis. In an alternate embodiment, the return springs may be underneath the motor and compress against the substrate that the light source array chip is mounted to. In this case, the diameter of the inner member should be greater than the width of the light source array semiconductor chip.

FIG. 4b shows a movable lens assembly for adjusting the lateral position of the object lens 402 relative to the light source array 404. As observed in FIG. 4b, a pair of actuator voice coil motors 421, 422 each with spring return 423, 424 are used to define the position of the objective lens 402 in each of the x and y dimensions, respectively. That is, one voice coil motor 421 and return spring 423 establish the x position of the lens 402 and the other voice coil motor 422 and return spring 424 establish the y position of the lens 402. The forces of the springs and motors are physically applied against the outer member 412 of the vertical member. Although for ease of drawing the outer member 412 as depicted in FIG. 4b has a cylindrical outer shape, in reality it may be square/rectangular so that the actuators 421, 422 can apply a flush force against the outer member at off axis positions of the lens 402.

FIG. 4c shows a movable lens assembly for adjusting the tilt angle of the lens. Here, a pair of voice coil motors 431, 432 each with spring return 433, 434 are used as actuators to define the vertical position of each of two points along the outer edge of the lens 402. The tilt angle of the lens 402 about the y axis is substantially defined by the force of a first motor 431 as applied against its return spring 433. The tilt angle of the lens 402 about the x axis is substantially defined by the force of a first motor 432 as applied against its return spring 434. From these basic scenarios, any tilt angle for the lens can be established as a function of the respective forces applied by the motors and the counteractive forces applied by the springs.

Additionally, the vertical positioning of the lens 402 can be established by actuating the two motors 431, 432 equally. That is, if both motors 431, 432 extend an equal amount outward the lens will be raised in the +z direction. Correspondingly, if both motors 431, 432 recess an equal amount inward the lens will be lowered in the −z direction. One or more additional voice coil motor actuators may be located along the periphery of the lens holder to further stabilize both tilt angle and vertical positioning of the lens (e.g., three actuators spaced 120° apart, four actuators spaced 90° apart, etc.).

Although the discussion above has emphasized the use of voice-coil motors, other embodiments may use other devices such as piezoelectric actuators or stepper motors.

FIG. 5a shows an integrated traditional camera and time-of-flight imaging system 500. The system has a connector 501 for making electrical contact, e.g., with a larger system/mother board, such as the system/mother board of a laptop computer, tablet computer or smartphone. Depending on layout and implementation, the connector 501 may connect to a flex cable that, e.g., makes actual connection to the system/mother board or the connector 501 may make contact to the system/mother board directly.

The connector 501 is affixed to a planar board 502 that may be implemented as a multi-layered structure of alternating conductive and insulating layers where the conductive layers are patterned to form electronic traces that support the internal electrical connections of the system 500.

An integrated "RGBZ" image sensor 503 is mounted to the planar board 502. The integrated RGBZ sensor includes different kinds of pixels, some of which are sensitive to visible light (e.g., a subset of R pixels that are sensitive to red visible blue light, a subset of G pixels that are sensitive to visible green light and a subset of B pixels that are sensitive to blue light) and others of which are sensitive to IR light. The RGB pixels are used to support traditional "2D" visible image capture (traditional picture taking) functions. The IR sensitive pixels are used to support 2D IR image capture and 3D depth profile imaging using time-of-flight techniques. Although a basic embodiment includes RGB pixels for the visible image capture, other embodiments may use different colored pixel schemes (e.g., Cyan, Magenta and Yellow).

The integrated image sensor 503 may also include, for the IR sensitive pixels, special signaling lines or other circuitry to support time-of-flight detection including, e.g., clocking signal lines and/or other signal lines that indicate the timing of the reception of IR light (in view of the timing of the emission of the IR light from the light source array 505).

The integrated image sensor 503 may also include a number or analog-to-digital converters (ADCs) to convert the analog signals received from the sensor's RGB pixels into digital data that is representative of the visible imagery in front of the camera lens module 504. The planar board 502 may likewise include signal traces to carry digital information provided by the ADCs to the connector 501 for processing by a higher end component of the computing system, such as an image signal processing pipeline (e.g., that is integrated on an applications processor).

A camera lens module 504 is integrated above the integrated RGBZ image sensor 503. The camera lens module 504 contains a system of one or more lenses to focus light received through an aperture onto the image sensor 503. As the camera lens module's reception of visible light may interfere with the reception of IR light by the image sensor's time-of-flight pixels, and, contra-wise, as the camera module's reception of IR light may interfere with the reception of visible light by the image sensor's RGB pixels, either or both of the image sensor 503 and lens module 504 may contain a system of filters (e.g., filter 510) arranged to substantially block IR light that is to be received by RGB pixels, and, substantially block visible light that is to be received by time-of-flight pixels.

An illuminator 507 composed of a light source array 505 beneath a movable objective lens 506 assembly is also mounted on the planar board 501. The light source array 505 may be implemented on a semiconductor chip that is mounted to the planar board 501. Embodiments of the light source array 505 and movable lens assembly 506 have been discussed above with respect to FIGS. 1 through 4.

Notably, one or more supporting integrated circuits for the light source array (not shown in FIG. 5a) may be mounted on the planar board 502. The one or more integrated circuits may include LED or laser driver circuitry for driving respective currents through the light source array's light sources and coil driver circuitry for driving each of the coils associated with the voice coil motors of the movable lens assembly. Both the LED or laser driver circuitry and coil driver circuitry may include respective digital-to-analog circuitry to convert digital information received through connector 501 into a specific current drive strength for the light sources or a voice coil. The laser driver may additionally including clocking circuitry to generate a clock signal or other signal having a sequence of 1s and 0s that, when driven through the light sources will cause the light sources to repeatedly turn on and off so that the depth measurements can repeatedly be made.

In an embodiment, the integrated system 500 of FIG. 5a supports three modes of operation: 1) 2D mode; 3) 3D mode; and, 3) 2D/3D mode. In the case of 2D mode, the system behaves as a traditional camera. As such, illuminator 507 is disabled and the image sensor is used to receive visible images through its RGB pixels. In the case of 3D mode, the system is capturing time-of-flight depth information of an object in the field of view of the illuminator 507 and the camera lens module 504. As such, the illuminator is enabled and emitting IR light (e.g., in an on-off-on-off . . . sequence) onto the object. The IR light is reflected from the object, received through the camera lens module 504 and sensed by the image sensor's time-of-flight pixels. In the case of 2D/3D mode, both the 2D and 3D modes described above are concurrently active.

FIG. 5b shows a method 500 that can be performed by the system of FIG. 5a. As observed in FIG. 5b, the system drives current through a light source array to cause light to be emitted from the light source array 551. The system collects and concentrates the light with a lens to form an emitted beam of light 552. The system moves the lens to direct the beam of light to a region of interest to form an illuminated region of interest within a field of view, where, the size of the illuminated region of interest is smaller than the field of view 553. The system detects at least a portion of the light after it has been reflected from an object of interest within the field of view and compares respective arrival times of the light against emission times of the light to generate depth information of the object of interest.

FIG. 6 shows a depiction of an exemplary computing system 600 such as a personal computing system (e.g., desktop or laptop) or a mobile or handheld computing system such as a tablet device or smartphone. As observed in FIG. 6, the basic computing system may include a central processing unit 601 (which may include, e.g., a plurality of general purpose processing cores 615_1 through 615_N and a main memory controller 617 disposed on an applications processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller), an I/O control function 618 and one or more image signal processor pipelines 619. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602 to write/read data to/from system memory 602. The image signal processing pipelines 619 receive image information from the camera 610 and process the raw image information for downstream uses. The power management control unit 612 generally controls the power consumption of the system 600.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650.

In an embodiment one or more cameras 610 includes an integrated traditional visible image capture and time-of-flight depth measurement system such as the system 500 described above with respect to FIG. 5. Application software, operating system software, device driver software and/or firmware executing on a general purpose CPU core (or other functional block having an instruction execution pipeline to execute program code) of an applications processor or other processor may direct commands to and receive image data from the camera system.

In the case of commands, the commands may include entrance into or exit from any of the 2D, 3D or 2D/3D system states discussed above with respect to FIG. 5. Additionally, commands may be directed to the movable lens sub-assembly of the illuminator to specify specific pointing directions of the movable lens, distance of the lens from the light source array (to specify illuminated region size) and a series of pointing directions of the movable lens to effect the aforementioned scanning of the aforementioned lens.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
    an integrated two-dimensional image capture and three-dimensional time-of-flight depth capture system, comprising:
        an illuminator to generate light for the time-of-flight depth capture system, the illuminator comprising:
            an array of light sources, and
            a movable lens assembly comprising:
                a single lens that defines a z axis aligned with the optical axis of the single lens, and an x axis and a y axis that are each perpendicular to the z axis and to each other,
                an x axis actuator that is configured to tilt the single lens about the x axis, and
                a y axis actuator that is configured to tilt the single lens about the y axis,
            wherein the x axis actuator and they axis actuator of the movable lens assembly are collectively configured to movably direct an emitted beam of the light that passes through the single lens to one of any of a plurality of locations within the illuminator's field of view to form an illuminated region of interest within the illuminator's field of view,
            wherein the illuminated region of interest having a size that is smaller than the illuminator's field of view, and
            wherein the single lens of the movable lens assembly is positioned to receive light from the array of light sources.

2. The apparatus of claim 1 wherein the integrated traditional two-dimensional image capture and three-dimensional time-of-flight system further comprise an integrated image sensor having a first set of pixels to detect traditional images and second set of pixels to detect light from said illuminator that has been reflected from an object of interest.

3. The apparatus of claim 2 wherein the array of light sources further comprises an array of VCSEL lasers integrated on a same semiconductor die.

4. The apparatus of claim 1 wherein the x axis actuator of the movable lens assembly and they axis actuator of the movable lens assembly comprise voice coil motors.

5. The apparatus of claim 1 wherein the movable lens assembly is configured to scan the illuminated region of interest over a portion of the field of view to create an effectively larger illuminated region of interest.

6. The apparatus of claim 1 wherein the x axis actuator of the movable lens assembly and they axis actuator of the movable lens assembly are configured to move the single lens both vertically and laterally in relation to the light source array.

7. The apparatus of claim 6 wherein the movable lens assembly is configured to scan the illuminated region of interest over a portion of the field of view to create an effectively larger illuminated region of interest.

8. The apparatus of claim 1 wherein the emitted beam of the light has less divergence than light emitted from the light source array.

9. A computing system, comprising:
    a plurality of general purpose processing cores;
    a memory controller coupled to a system memory;
    an image signal processor coupled to an integrated two-dimensional image capture and three-dimensional time-of-flight depth capture system, comprising:
    an illuminator to generate light for the time-of-flight depth capture system, the illuminator comprising:
        an array of light sources, and a movable lens assembly comprising:
- a single lens that defines a z axis aligned with the optical axis of the single lens, and an x axis and a y axis that are each perpendicular to the z axis and to each other,
- an x axis actuator that is configured to tilt the single lens about the x axis, and
- a y axis actuator that is configured to tilt the single lens about the y axis,
- wherein the x axis actuator and they axis actuator of the movable lens assembly are collectively configured to movably direct an emitted beam of the light that passes through the single lens to one of any of a plurality of locations within the illuminator's field of view to form an illuminated region of interest within the illuminator's field of view,
- wherein the illuminated region of interest having a size that is smaller than the illuminator's field of view, and
- wherein the single lens of the movable lens assembly is positioned to receive light from the array of light sources.

10. The computing system of claim 9 wherein the computing system is a mobile computer having an applications processor, the plurality of general purpose processing cores and the memory controller being integrated on the applications processor.

11. The computing system of claim 10 wherein the image signal processor is integrated on the applications processor.

12. The computing system of claim 10 wherein the mobile computer is one of:
- a tablet computer;
- a smartphone.

13. The computing system of claim 9 wherein the integrated traditional two-dimensional image capture and three-dimensional time-of-flight system further comprise an integrated image sensor having a first set of pixels to detect traditional images and second set of pixels to detect light from said illuminator that has been reflected from an object of interest.

14. The apparatus of claim 9 wherein the x axis actuator and the y axis actuator of the movable lens assembly comprise voice coil motors that are configured to move the single lens of the movable lens laterally and vertically with respect to the light source array.

15. The apparatus of claim 9 wherein the x axis actuator and the y axis actuator of the movable lens assembly comprise voice coil motors that are configured to tilt the movable lens with respect to the light source array.

* * * * *